United States Patent [19]

Tokuhara et al.

[11] Patent Number: 4,459,016

[45] Date of Patent: Jul. 10, 1984

[54] PROJECTION DEVICE

[75] Inventors: Mitsuhiro Tokuhara, Chigasaki; Masamichi Tateoka, Tokyo; Teruo Morikawa, Sagamihara; Akiyoshi Torigai, Machida; Tsutomu Toyono, Tokyo, all of Japan

[73] Assignee: Canon Kabushiki Kaisha, Tokyo, Japan

[21] Appl. No.: 356,027

[22] Filed: Mar. 8, 1982

[30] Foreign Application Priority Data

Mar. 18, 1981 [JP] Japan .................................. 56-38888

[51] Int. Cl.³ ....................... G03B 27/34; G03B 27/40; G03B 27/70

[52] U.S. Cl. .......................................... 355/57; 355/71

[58] Field of Search ..................... 355/8, 11, 51, 57, 71

[56] References Cited

U.S. PATENT DOCUMENTS

| | | | |
|---|---|---|---|
| 3,438,704 | 4/1969 | Schoen | 355/8 |
| 3,709,602 | 1/1973 | Satomi | 355/57 X |
| 4,046,467 | 9/1977 | Laskowski et al. | 355/57 X |
| 4,113,373 | 9/1978 | Eppe et al. | 355/71 X |
| 4,260,249 | 4/1981 | Armitage, Jr. et al. | 355/57 X |

*Primary Examiner*—Richard A. Wintercorn

*Attorney, Agent, or Firm*—Fitzpatrick, Cella, Harper & Scinto

[57] ABSTRACT

A projection device for projecting a first surface onto a second surface comprises a device for forming an image of the first surface on the second surface, a slit provided near the image forming device for making the quantity of light of the light beam on the second surface equal in each portion of the image, a device for moving the image forming device to vary the imaging magnification of the image of the first surface on the second surface, and a device for moving the slit, with movement of the image forming device, to a distance substantially equal to the distance by which the slit has been spaced apart from the image forming device before the image forming device is moved.

13 Claims, 8 Drawing Figures

PROJECTION DEVICE

BACKGROUND OF THE INVENTION

1. Field of the Invention

This invention relates to a projection device in which the exposure amount distribution due to the cosine 4th power rule of the lens is corrected even if the projection magnification is varied, and particularly to a projection device effective for copying apparatus of the slit exposure type which requires a uniform exposure amount in the lengthwise direction of the slit.

2. Description of the Prior Art

In variable magnification copying apparatus of the slit exposure type, there is a problem that exposure irregularity due to the so-called cosine 4th power rule to the angle of view is created in the lengthwise direction of the slit when the slit area of an original is projected onto a photosensitive medium by a lens.

To solve this problem, some apparatus use a light source such as a halogen lamp having a brightness distribution which corrects the cosine 4th power rule in the lengthwise direction, that is, such a distribution which increases the brightness in the marginal area as compared with the central area, whereas such apparatus have suffered from great irregularity in light distribution and required a special specification and this has led to a high cost of manufacture.

On the other hand, in copying apparatus using a light source such as a fluorescent lamp having a uniform brightness distribution, it is necessary that a stop plate for correcting the cosine 4th power rule be provided in the optical path. Among the apparatus provided with such a slit plate, there are ones in which a number of slit plates are put in and out during magnification change as shown in Japanese Laid-open Utility Model Application No. 84643/1980, ones in which an inclined slit plate is put in and out as shown in Japanese Laid-open Patent Application No. 91728/1978, ones in which a view field slit plate is moved near the photosensitive medium in the lengthwise direction of the slit as shown in Japanese Laid-open Patent Application No. 155523/1977, and ones in which a view field slit plate near the photosensitive medium is moved in a direction perpendicular to the lengthwise direction of the slit (scanning direction) relative to movement of the lens as shown in Japanese Laid-open Patent Application No. 54023/1979. However, these apparatus have suffered from the following disadvantages. As regards the apparatus in which a number of slit plates are put in and out, they have an increased number of mechanical parts and the change-over operation for each varied magnification or the shape adjustment of the slit plate during each magnification change is complicated, and this has led to a high cost.

As regards the apparatus in which an inclined slit plate is put in and out, correction irregularity can be well corrected while the mechanism for putting the slit plate in and out is complicated.

As regards the apparatus in which the slit is moved near the photosensitive medium, it is spatially difficult to mount a moving mechanism and the apparatus become bulky.

SUMMARY OF THE INVENTION

It is an object of the present invention to eliminate the above-noted disadvantages and to provide a projection device which is capable of correcting exposure irregularity by a simple construction even when the projection magnification has been varied.

In the projection device according to the present invention, it has been found that near an image forming optical system for forming an image of a projected first surface at a predetermined position, the diameter of the cross section of the light beam entering or exiting the optical system is not greatly varied during magnification change. A brightness stop for uniformizing the brightness of the image of the first surface formed at said predetermined position in any portion of the image is provided at said position so that even if the image forming optical system is moved during magnification change, the brightness stop is disposed always at a position spaced apart by a substantially constant distance relative to the image forming optical system. Thus, even during magnification change, the same brightness stop can be used and as a simplest construction, the position of the brightness stop is fixed relative to the image forming optical system and the image forming optical system and the brightness stop can be moved together with each other.

The projection device according to the present invention is applicable to an apparatus in which a member for forming an image is disposed at said predetermined position, such as, for example, a copying apparatus in which a photosensitive medium is disposed at said predetermined position, or to a reading apparatus in which a photodetector, for example, a photosensor array, is disposed at said predetermined position.

In the device according to the present invention, the image forming optical system may be either a fixed focus lens or a variable focus lens. In the case of a fixed focus lens, however, optical means for adjusting the length of the optical path in accordance with a varied magnification is necessary because the first surface and the predetermined position whereat the image of the first surface is formed become optically conjugate with each other during magnification change. Where the image forming optical system comprises a zoom lens, said optical means is unnecessary because, even during magnification change, the first surface and said predetermined position can be maintained in optically conjugate positional relation by the zoom lens.

The invention will become more fully apparent from the following detailed description thereof taken in conjunction with the accompanying drawings.

DESCRIPTION OF THE PREFERRED EMBODIMENT

Figure 1:
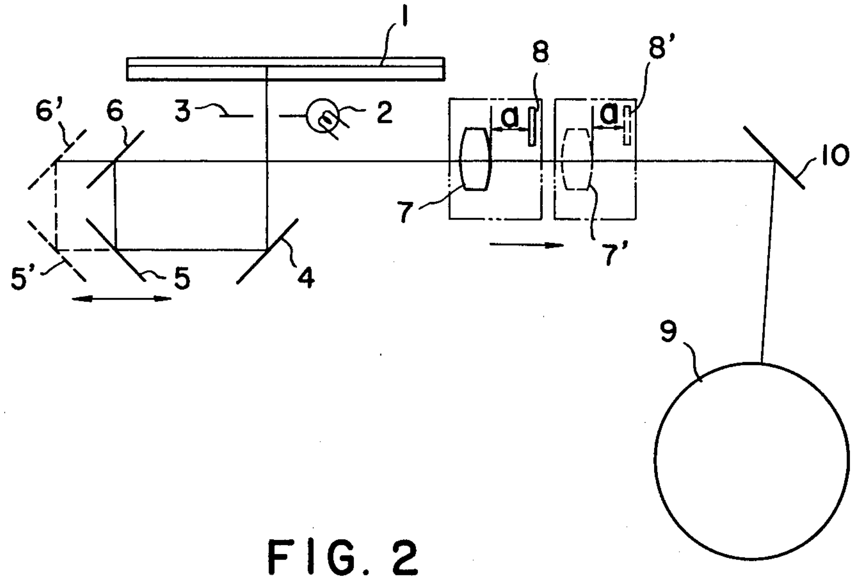
FIG. 1 shows a variable magnification copying apparatus of the slit exposure type provided with the projection device of the present invention.

FIG. 1 shows an embodiment of the copying apparatus to which the projection device of the present invention is applied. In FIG. 1, an original 1 resting on a transparent platen glass is illuminated by an illuminating light source 2, and the image light from a slit area controlled by a slit width controlling member 3 having a predetermined width in spite of magnification change is reflected on a stationary mirror 10 by a lens 7 via a stationary mirror 4 and displaceable mirrors 5, 6 displaced for the correction of the length of the optical path during magnification change and is projected onto a photosensitive medium 9 in the form of a slit having a different width correspondingly to the magnification. The original 1 is moved in synchronism with the movement of the photosensitive medium 9, whereby the entire surface of the original is successively projected onto the photosensitive medium. Designated by 8 is a stop plate according to the present invention which is provided at a distance a from the lens 7 in the direction of the optical axis. The shape of the stop plate 8 is such that in the lengthwise direction of the slit, more light is intercepted in the central area thereof than in the marginal area thereof. Due to such shape, the stop plate corrects the exposure amount distribution based on the cosine 4th power rule of the lens 7 and provides a uniform exposure on the photosensitive medium 9.

During magnification change, the lens 7 is moved along the direction of the optical axis and displaced to a lens position 7′ indicated by broken line. Likewise, the displaceable mirrors 5 and 6 are respectively displaced to mirror positions 5′ and 6′ indicated by broken lines to thereby correct the length of the optical path and maintain the imaging relation during magnification change. In a copying apparatus of the type in which an end of the original is positionally adjusted, the lens 7 is displaced in a direction perpendicular to the plane of the drawing sheet during magnification change.

The stop plate 8 is moved with the lens 7 during magnification change so as to assume a stop plate position 8′ indicated by broken line.

Thus, in the present invention, if the stop plate 8 is initially adjusted at a standard magnification, the exposure irregularity correction at a variable magnification will be guaranteed, and the principle of the present invention will hereinafter be described by reference to FIGS. 2 and so on.

Figure 2:
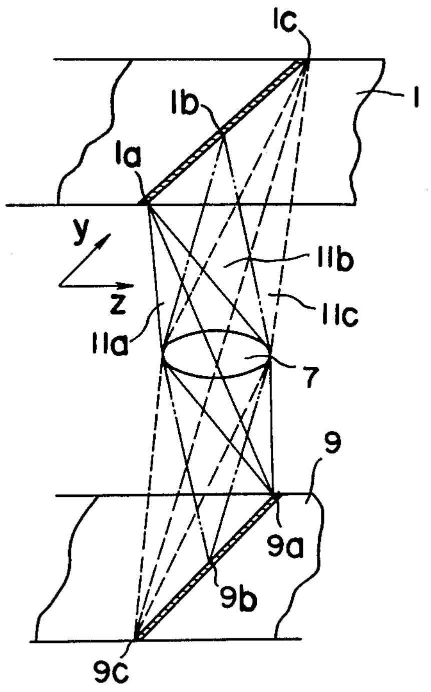
FIG. 2 is a view for illustrating the projected light beam from each object point in the slit area.

In FIG. 2, in y direction (lengthwise direction of the slit) which is perpendicular to x direction (scanning direction), the object points 1*a*, 1*b* and 1*c* in the slit area of the original 1 are projected onto image points 9*a*, 9*b* and 9*c*, respectively, by the lens 7.

Figure 3:
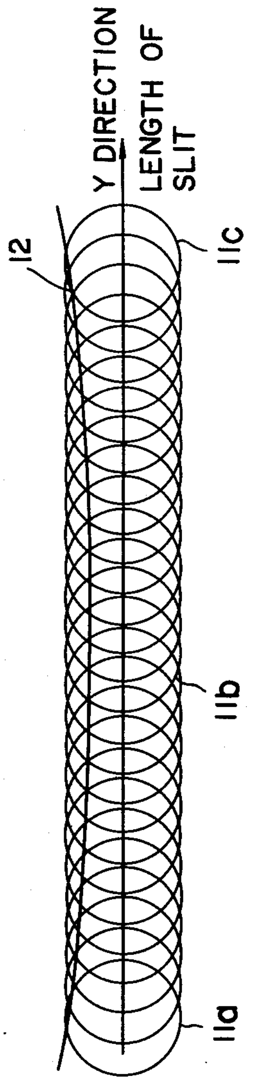
FIG. 3 shows the cross section of each projected light beam in the lengthwise direction of the slit.

Considering the cross sections of projected light beams in a plane perpendicular to the optical axis, all of them are circles 11*a*, 11*b* and 11*c* equal in cross-sectional area as shown in FIG. 3.

If the transmission efficiency of the lens 7 is uniform in y direction, uniform exposure will take place on the image plane, but since the lens generally has a transmission efficiency distribution of the cosine 4th power rule, that is, since it has a transmission efficiency $\cos^4\theta$ times for an angle of view $\theta$, the exposure amount on the image plane becomes smaller in the marginal area than in the central area in y direction. To correct this, in y direction, a stop plate having a curve 12 of such a shape that intercepts more of the light beam in the central area than in the marginal area is provided perpendicularly to the optical axis in the optical path, thereby correcting any unbalance of the exposure amount. The stop plate acts as a brightness stop.

Figure 4:
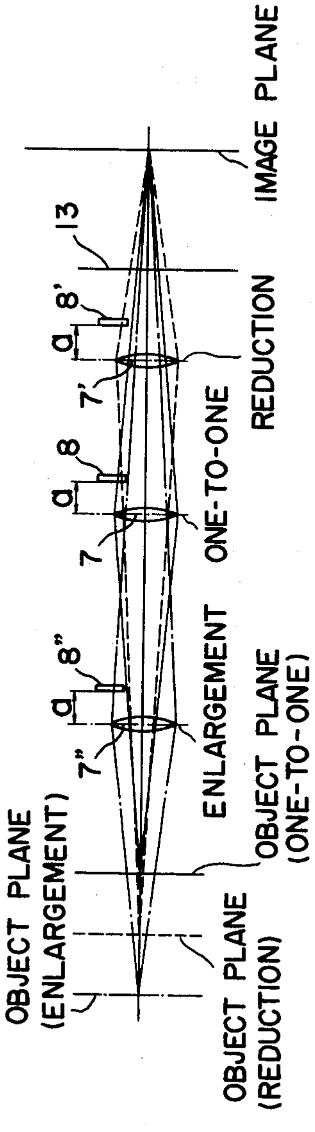
FIG. 4 is a view for illustrating the position of a stop provided in the optical path during magnification change.

While description has so far been made of a certain magnification, the correction of the distribution of quantity of light based on the cosine 4th power rule becomes necessary also during magnification change. Now consider a case where the magnification has been changed. In FIG. 4, first consider a system wherein the stop plate having the curve 12 is fixed at a position 13 in spite of magnification change. At this time, as is apparent from the figure, the cross-sectional area of the circle which is the cross section of the projected light beam greatly varies for each varied magnification at the position 13, and the relation of the exposure irregularity correction adjusted in FIG. 3 is destroyed during magnification change. That is, even if exposure irregularity is corrected at a certain magnification, exposure irregularity will occur if the magnification is changed.

The stop plate having such curve 12, if it is fixed at any position in the optical path, cannot completely correct exposure irregularity under all magnifications. However, applicant has found that, as can be seen from FIG. 4, in the vicinity of the lens, the cross-sectional area of the circle which is the cross section of the projected light beam does not greatly vary in spite of magnification change. By disposing the stop plate in the vicinity of this lens and setting the stop plate so that the lens and the stop plate are moved together during magnification change such that the same stop plate is disposed always at a predetermined position relative to the lens in spite of the varied magnification, there has been provided a device which is no less excellent in the effect of correcting irregularity of quantity of light than the device according to the prior art.

However, if the stop plate 8 is coincident with the pupil position of the lens 7, it will act as a complete aperture stop and will not act as a brightness top for correcting the cosine 4th power rule and therefore, it is necessary that the stop plate 8 be provided at a position near the lens which is not coincident with the pupil position of the lens 7.

By the stop plate 8 being thus provided near the lens 7 and moved with the lens 7 during magnification change, exposure irregularity can be well corrected at all magnifications by a common brightness stop having the curve 12 in a condition in which the fluctuation of the cross-sectional area of the projected light beam is small.

Figure 5:
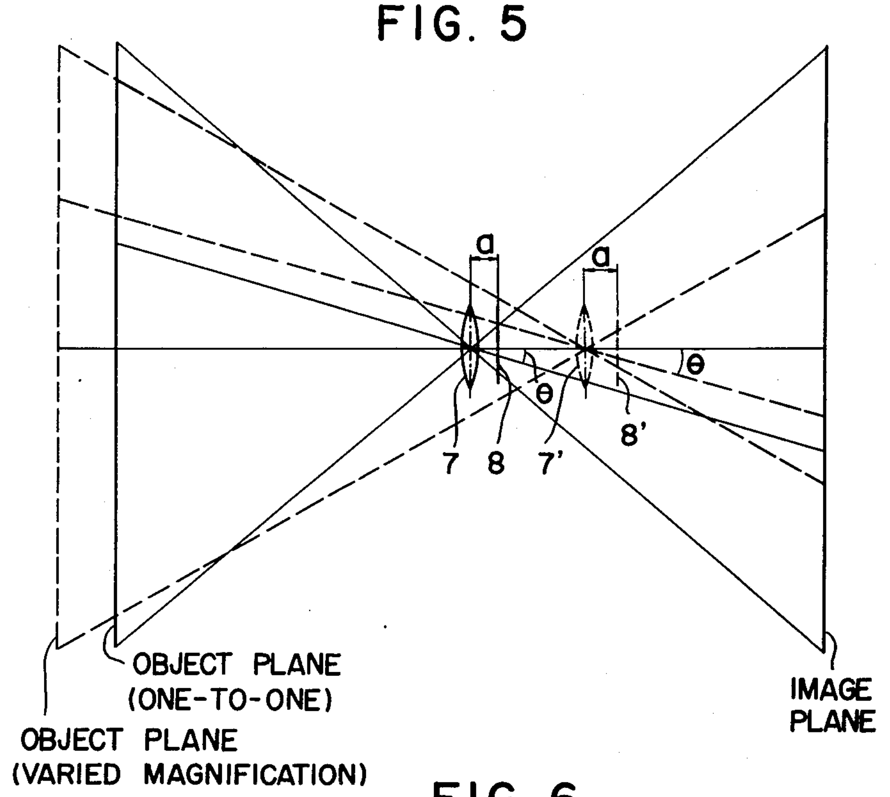
FIG. 5 is a view for illustrating the correction of exposure irregularity during magnification change.

FIG. 5 shows the controlling position of the stop plate 8 at each magnification for the same angle of view $\theta$. Considering the principal ray incident on the lens 7 at an angle $\theta$ during the standard magnification, the stop plate 8 controls the projected light beam at a position distant by a $\tan\theta$ from the optical axis.

Likewise, considering the principal ray incident on the lens 7′ at an angle $\theta$ during magnification change, the stop plate 8′ control the projected light beam at the same position distant by a $\tan\theta$ from the optical axis. Even if the magnification differs therefrom, it is confirmed that the projected light beam incident on the lens at a certain angle of view $\theta$ is controlled at the same position of the stop plate and the cosine 4th power rule distribution is corrected in spite of a varied magnification. When magnification is changed, the maximum angle of view at each magnification becomes different, but if the stop plate 8 is extended in the lengthwise direction of the slit to such an extent that it can control the light beam incident at the maximum angle of view, exposure amount will be corrected with respect to the projected light beams incident at all angles and moreover at all magnifications to thereby provide a uniform exposure on the image plane.

Figure 6:
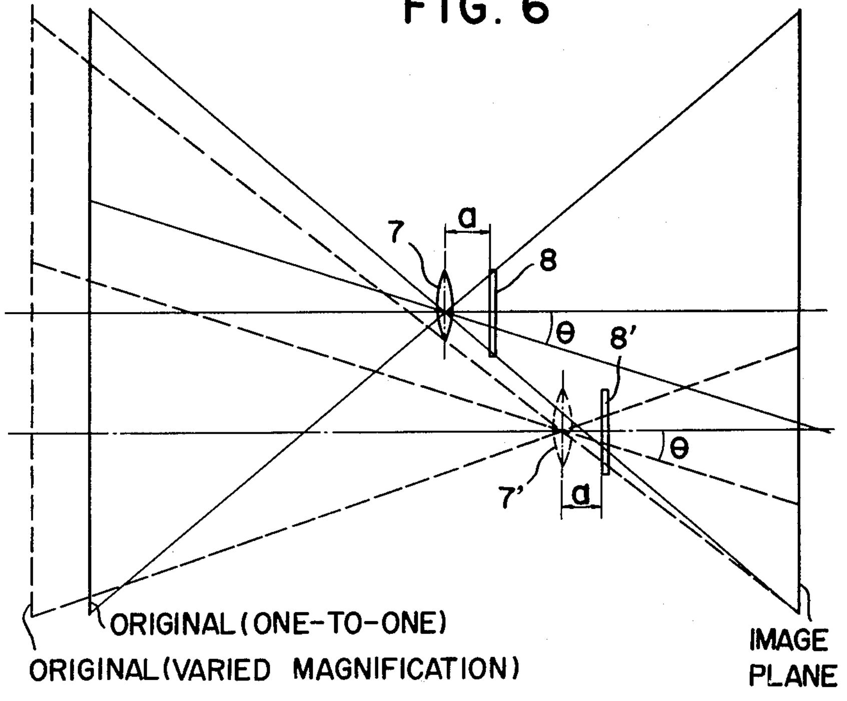
FIG. 6 is a schematic view of an optical system in a case where the present invention is applied to a copying apparatus of the type in which the standard end of the original is positionally adjusted.

FIG. 6 illustrates a case where the present invention is applied to a copying apparatus of the type in which an original is positionally adjusted to the standard end portion of the original carriage. In such a copying apparatus, the lens 7 is moved in the direction of the optical axis and in a direction perpendicular to the optical axis in order that the standard end portion of the original may be projected onto the standard end portion of the image plane.

Again in this case, the principal ray incident on the lens 7 at an angle $\theta$ during the standard magnification and the principal ray incident on the lens 7' at an angle $\theta$ during a varied magnification are controlled at the same position of the stop plate 8, namely, at the position distant by a tan $\theta$ from the optical axis, and exposure irregularity is corrected even if magnification is changed.

Now, during magnification change, the lens 7 is moved in a direction perpendicular to the optical axis to assume the position of the lens 7' and the range of angle at which light is incident on the lens 7' becomes asymmetric with respect to the optical axis, but this merely means that the range of the lengthwise direction of the slit in which the stop plate 8 is used and the range of the lengthwise direction of the slit in which the stop plate 8' is used differ from each other. That is, during magnification change, the range which contributes to the projected light beam control of the stop plate 8' only becomes a range which is asymmetric with respect to the optical axis.

Figure 7:
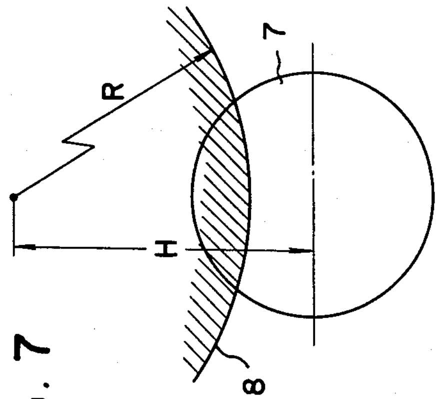
FIG. 7 shows the manner in which an arc is adopted as the stop shape of a stop plate.

The stop plate 8 should ideally have the curve 12 shown in FIG. 3, namely, a curve corresponding to $\cos^4\theta$, but with the ease of manufacture thereof taken into consideration, the stop plate 8 may be made approximate to a circle as shown in FIG. 7.

In FIG. 7, the stop plate 8 comprises a portion of a disc including a circumferential portion of radius R centered at a point spaced apart by a distance H from the optical axis. An example of the experiment of exposure irregularity correction using the stop plate comprising a portion of such a disc will be shown below.

A lens having a focal length 160 mm and F-value 6 was used as the lens 7, and a stop plate in which H was 210 mm and R was 208 mm was provided at a location spaced apart by 100 mm from the rearward pupil of the lens, and when the exposure irregularity distribution in the lengthwise direction of the slit was measured at one-to-one (X1), reduction (X0.64) and enlargement (X1.27), it was suppressed within 4% at greatest even if magnification was changed. The stop plate 8 is not restricted to a circle, but may be of other quadratic curve or approximate to a polygon.

It is desirable that the stop plate 8 be made into a regular shape and set up at a regular position in the optical path, but even if it is erroneously set up, exposure irregularity correction can be finely adjusted by finely adjusting it in x direction (scanning direction), y direction (lengthwise direction of the slit) and z direction (direction of the optical axis). That is, general increase or decrease in the absolute exposure amount is accomplished by translational adjustment in x direction or z direction and the unbalance in the lengthwise direction of the slit is accomplished by translational adjustment in y direction or rotational adjustment in xy plane.

Further, any manufacturing error of the radius of curvature R may be compensated for in the following manner. That is, if the stop plate is fixed in y direction and rotated in xz plane, the radius of curvature will become apparently greater.

On the other hand, if the stop plate is fixed in x direction passing through the center and rotated in yz plane, the radius of curvature will become apparently smaller.

While the stop plate 8 has been described as being disposed at a position near the image plane side of the lens 7, it may also be disposed at a position near the object side of the lens 7 and it may be not only one which intercepts the light beam from one side but also one which intercepts the light beam by dividing it into two on both sides.

The slit width controlling member 3 may be provided either in the optical path near the original surface or immediately in front of the photosensitive medium which is the image plane. The slit width generally contributes only to the absolute image density. During magnification change, the image density on the photosensitive medium is determined by the slit width on the image plane, the velocity of movement and the intensity of illumination and therefore, generally it is variable and by magnification, there is caused a case where the absolute amount thereof is insufficient, but this may be readily adjusted by increasing the input voltage of the light source having a flat light distribution in the lengthwise direction of the slit in accordance with magnification change and varying the intentisy of illumination on the image plane. Also, the present invention is of course applicable to an apparatus using, besides the scanning means shown in FIG. 1, well-known scanning means wherein the original 1 is fixed and an optical element disposed between the original 1 and the photosensitive medium 9 is moved to thereby effect slit scanning of the original surface.

Figure 8:
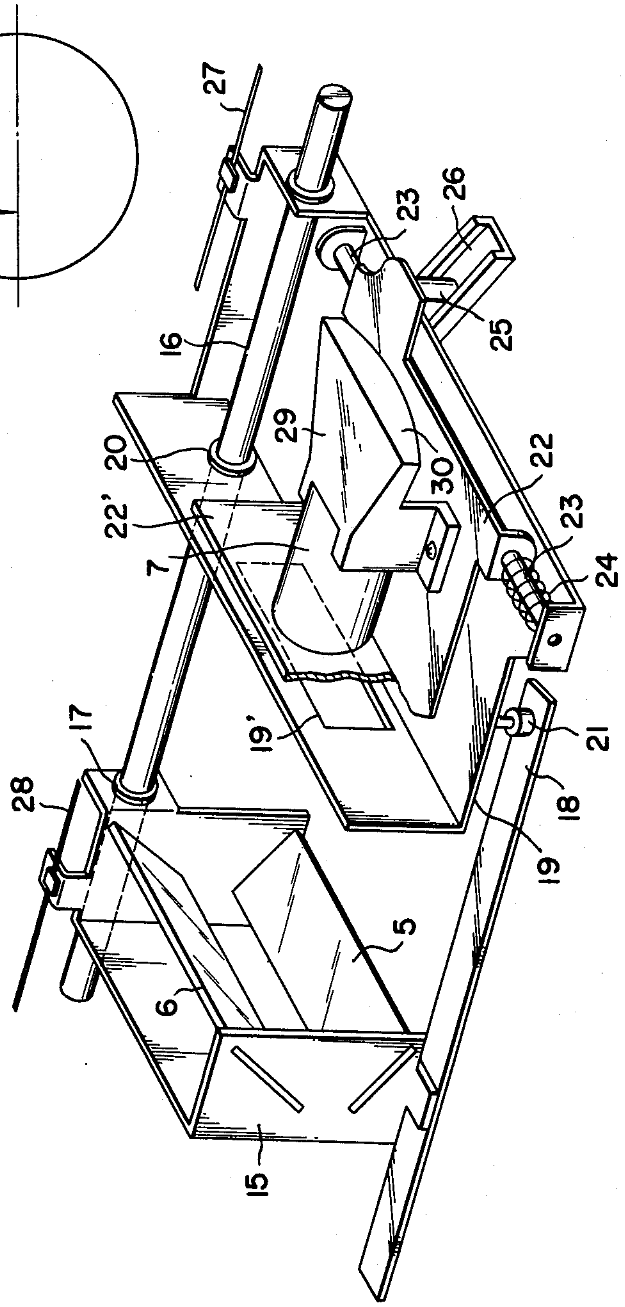
FIG. 8 illustrates a mechanism for moving the lens and mirrors in a case where the present invention is applied to a copying apparatus.

FIG. 8 illustrates a mechanism for moving the lens and mirrors of a slit scanning type copying apparatus to which the device of the present invention is applied. In FIG. 8, reference numeral 15 designates a first base to which mirrors 5 and 6 are fixed. The base 15 is supported on a first guide rail 16, disposed parallel to the optical axis of the lens 7, by means of sliding bearing 17, for movement along the rail 16. The other end portion of the base 15 is slidably placed on an auxiliary guide rail 18 parallel to the rail 16.

Designated by 19 is a second base. The innermost side of the second base 19 is movably supported on the guide rail 16, disposed parallel to the optical axis, by means of sliding bearing 20. This side of the second base 19 is slidably supported on the auxiliary rail 18, disposed parallel to the optical axis, by means of a slider 21.

A lens bed 22 having the lens 7 mounted thereon is movably supported on a second rail 23 having one end fixed to the base 19 and perpendicular to the rail 16, and one end of the lens bed 22 is supported by an unshown sliding member so as to be parallel to the rail 16. A compression spring 24 biases the lens bed 22 toward the rail 16. The lens 7 is fixed to the lens bed by unshown means, and is inserted into an aperture formed in a light-intercepting portion 22' and loosely receiving the lens. An opening 19' for passing the image forming light beam therethrough and causing it to enter the lens is formed in the portion of the base 19 which confronts the lens.

A cam follower 25 loosely fitted in a groove cam 26 is caulked and fixed to the lens bed.

The groove cam 26 is fixed obliquely with respect to the optical axis so that the lens 7 is movable also in a direction perpendicular to the optical axis as it is moved in the direction of the optical axis, and the cam is so configured that the ends of the original are projected onto predetermined locations on the ends of the drum, as previously described.

Wire 27 is wound on a driving device, not shown, and fixed to the second base 19, thereby moving the lens unit in the direction of the optical axis. That is, when the base 19 is moved along the optical axis under the guidance of the rails 16 and 18, the lens bed 22 is guided by the cam 26 under the control of the second rail 23 and moved in a direction inclined with respect to the optical axis of the lens 7. Thus, the lens 7 is moved in the direction inclined with respect to the optical axis as mentioned above.

Wire 28 is also wound on a driving device, not shown, and fixed to the first base 15, thereby moving the first base 15 under the guidance of the rail 16. Thus, the mirrors 5 and 6 are moved along the optical axis of the lens 7.

A cover 29 provided with a stop plate for correcting exposure irregularity is provided on that side of the lens 7 from which the light beam exits. The stop plate may be provided in the cover 29 or alternatively, the light beam exit portion 30 of the cover 29 may provide the stop plate. The cover 29 is secured to the lens and bed 22 by means of screws or the like and accordingly, the stop plate always keeps a predetermined positional relation with the lens 7 irrespective of magnification change.

What we claim is:

1. A device for projection of an image of a first surface onto a second surface, said device comprising:
- means for forming an image of the first surface on the second surface;
- slit means provided near said image forming means for controlling the quantity of light on the second surface, said slit means having a slit width which is maintained constant irrespective of the imaging magnification of the image formed on the second surface;
- means for moving said image forming means to vary the imaging magnification of the image of the first surface on the second surface; and
- means for moving said slit means, with movement of said image forming means, through a distance so that said slit means is spaced apart from said image forming means by substantially the same distance by which said slit means has been spaced apart from said image forming means before said image forming means is moved to vary the imaging magnification of the image of the first surface formed on the second surface.

2. A projection device according to claim 1, wherein said image forming means and said slit means are movable together.

3. A projection device according to claim 1, wherein said image forming means is a fixed focus lens.

4. A projection device according to claim 1, wherein said image forming means is a zoom lens.

5. A slit scanning projection device for scanning a first surface and successively forming a slit image of the first surface at a predetermined position, said device comprising:
- means for forming an image of the first surface at a predetermined position;
- means for limiting the image of the first surface formed at said predetermined position to a slit-like form;
- light beam limiting means disposed near said image forming means for making the brightness of the image formed at said predetermined position uniform, said light beam limiting means having an opening of a width which is maintained constant irrespective of the imaging magnification of said image forming means; and
- means for maintaining the spacing between said image forming means and said light beam limiting means always constant even if said image forming means and said light beam limiting means are moved along the optical axis of said image forming means in order to vary the imaging magnification of the slit image of the first surface formed at said predetermined position.

6. A projection device according to claim 5, wherein said image forming means is a fixed focus optical element, and an optical member is further disposed for varying the length of the optical path between the position of said first surface and said predetermined position when said optical element is moved.

7. A projection device according to claim 5, wherein said image forming means is a variable focus optical element.

8. A projection device according to claim 6 or 7, further comprising light detecting means or photosensitive medium is disposed at said predetermined position.

9. A projection device according to claim 8, wherein slit scanning the first surface is effected by moving of said first surface.

10. A projection device according to claim 8, wherein scanning of the first surface is effected by moving the optical member disposed between said first surface and said predetermined position.

11. A copying apparatus having a magnification changing function, said apparatus comprising:
- a lens system for forming an image of an original on a photosensitive surface;
- a first stop for limiting the image of the original projected on the photosensitive surface to a slit-like form;
- scanning means for successively forming the image of the original on the photosensitive surface;
- a second stop provided near said lens system to make the brightness of the slit image on the photosensitive surface uniform, said second stop having an opening of a width which is maintained constant irrespective of the imaging magnification of the image formed on said photosensitive surface;
- means for moving said lens system and said second stop in the direction of the optical axis and in two component directions orthogonal to the optical axis during magnification change; and
- means for making the distance between said lens system and said second stop after a movement during a magnification change equal to the distance between them before such movement.

12. A copying apparatus according to claim 11, wherein said second stop is fixedly provided relative to said lens system, and said second stop and said lens system are moved together with each other during magnification change.

13. A copying apparatus according to claim 11, wherein the stop shape of said second stop is arcuate.

* * * * *